(12) United States Patent
Bot et al.

(10) Patent No.: US 12,268,116 B2
(45) Date of Patent: Apr. 8, 2025

(54) SEED PRESS WHEEL

(71) Applicant: MASCHIO GASPARDO S.P.A., Campodarsego (IT)

(72) Inventors: Luigi Giovanni Bot, Portogruaro (IT); Gianfranco Donadon, Concordia Sagittaria (IT)

(73) Assignee: Maschio Gaspardo S.p.A., Campodarsego (IT)

( * ) Notice: Subject to any disclaimer, the term of this patent is extended or adjusted under 35 U.S.C. 154(b) by 1099 days.

(21) Appl. No.: 16/619,772

(22) PCT Filed: Jun. 6, 2018

(86) PCT No.: PCT/IB2018/054055
§ 371 (c)(1),
(2) Date: Dec. 5, 2019

(87) PCT Pub. No.: WO2018/224981
PCT Pub. Date: Dec. 13, 2018

(65) Prior Publication Data
US 2020/0137945 A1    May 7, 2020

(30) Foreign Application Priority Data

Jun. 6, 2017 (IT) .......................... 102017000061686

(51) Int. Cl.
*A01C 5/06* (2006.01)
*B29C 44/04* (2006.01)
(Continued)

(52) U.S. Cl.
CPC .............. *A01C 5/068* (2013.01); *B29C 44/04* (2013.01); *B29D 30/02* (2013.01); *B29C 2791/001* (2013.01); *B29L 2030/006* (2013.01)

(58) Field of Classification Search
CPC ... A01C 5/068; B29C 44/04; B29C 2791/001; B29D 30/02; B29L 2030/006
See application file for complete search history.

(56) References Cited

U.S. PATENT DOCUMENTS 3,396,773 A     8/1968  Alderfer
3,894,776 A  *  7/1975  Black ..................... B60B 37/10
                                                  301/64.704
(Continued)

FOREIGN PATENT DOCUMENTS

CN      105346332 A  *  2/2016  ............... B60C 7/10
DE        3335899 A1 *  4/1984  ............... B60C 7/22
(Continued)

OTHER PUBLICATIONS

"DuraLok Seed-Lock Wheel" from https://www.exapta.com/2034-2 (2017).

(Continued)

*Primary Examiner* — Alicia Torres
(74) *Attorney, Agent, or Firm* — Stradley Ronon Stevens & Young, LLP

(57) ABSTRACT

Seed press wheel for sowing units for precision seeders. The seed press wheel includes a solid tire in the shape of a disc that has a hole or central axis for mounting the tire on a hub. The solid tire has a first portion extending radially from the central axis, and a second portion extending radially from the first portion, the first portion being made of a first material having a first modulus of elasticity value, and the second portion being made of a second material having a second modulus of elasticity value, the first modulus of elasticity value being different from the second modulus of elasticity value.

13 Claims, 2 Drawing Sheets

(51) Int. Cl.
*B29D 30/02* (2006.01)
*B29L 30/00* (2006.01)

(56) References Cited

U.S. PATENT DOCUMENTS

| | | | | |
|---|---|---|---|---|
| 4,091,856 | A * | 5/1978 | Jackson | B29D 30/04 |
| | | | | 152/532 |
| 4,294,491 | A * | 10/1981 | Black | B60B 27/0094 |
| | | | | 301/105.1 |
| 4,295,686 | A * | 10/1981 | Black | B29D 30/02 |
| | | | | 301/105.1 |
| 6,227,622 | B1 | 5/2001 | Roderick et al. | |
| 10,575,455 | B2 * | 3/2020 | Gebbeken | F16C 19/06 |
| 2016/0128266 | A1 | 5/2016 | Phely et al. | |

FOREIGN PATENT DOCUMENTS

| | | | | |
|---|---|---|---|---|
| EP | 0144582 A2 * | 9/1984 | | B60C 7/00 |
| EP | 1486107 | 12/2004 | | |
| EP | 1461988 | 4/2012 | | |
| JP | H0840008 A * | 8/1994 | | B29D 30/0679 |
| WO | 2017/071692 | 5/2017 | | |
| WO | WO-2018001498 A1 * | 1/2018 | | B29D 30/02 |

OTHER PUBLICATIONS

International Search Report for International Application No. PCT/IB2018/054055 mailed Sep. 27, 2018.

* cited by examiner

SEED PRESS WHEEL

RELATED APPLICATIONS

The present application is a U.S. national phase application of International Application No. PCT/IB2018/054055 filed on Jun. 6, 2018, which claims the benefit of priority to Italian Patent Application No. 102017000061686, filed on Jun. 6, 2017, the contents of which are incorporated in this application by reference.

TECHNICAL FIELD

The invention relates to a seed press wheel.

TECHNICAL BACKGROUND

In precision seeders it is known to use a wheel disposed downstream of the seed drop pipe so as to gently press each seed to the bottom of the sowing furrow. Each wheel is subject to numerous problems, such as the fact that it must resist wear and damage resulting from contact with the ground to be sown, and at the same time must have a certain resilience so as to be able to ensure, by deforming, that adhesion of the soil to the mantle or the flanks of the wheel is avoided.

Among the documents that are relevant in this technical field, the document "DuraLok Seed Wheels" (available at https://www.exapta.com/2034-2/) describes a seed press wheel which is made of a highly wear-resistant polymer material, has a streamlined profile, and is equipped with replaceable pads.

In particular, the above-mentioned document describes the use of "Duralok", an industrial highly wear-resistant polyvinyl chloride, as a material which forms a solid-disc seed press wheel for the purpose of creating a device that can last for a very long time without having to be frequently replaced due to cuts or damage caused by the ground during use. It is also demonstrated that the increased wear resistance reduces the adhesion of mud to the disc itself and thus also reduces the possibility of sowing failure and of the sowing unit becoming clogged.

This technical solution, however, has a number of disadvantages, as discussed below.

It is known that the furrows produced by the sowing unit of a seeder can have a discontinuous shape that is not perfectly regular and varies in terms of direction and configuration, depending for example on unexpected hard elements contained in the ground (rocks, roots, etc.) and/or variations in the gradient of the ground itself.

Since DuraLok is a polyvinyl chloride disc that has high wear-resistance, this makes it impossible for that disc to deform extensively or quickly so as to effectively follow the shapes or directions of the furrows in which the seeds are sown.

It should also be noted that, as asserted by the manufacturer, this property of wear resistance does not necessarily result in a reduced amount of mud adhered to the disc, this being dependent on different parameters, such as surface wettability (according to a chemical analysis) and/or the possibility of mud adhering to/residing on the surface of the disc (according to a morphological and/or mechanical analysis). The aforementioned disc therefore does not have a self-cleaning function that substantially reduces the amount of mud that becomes adhered, and therefore is not able to effectively prevent possible sowing failures or prevent the seeder unit from becoming clogged.

SUMMARY OF THE INVENTION

An object of the present invention is to provide a seed press wheel that overcomes one or more of the disadvantages of the identified prior art.

Within the scope of this object, another object of the invention is to provide a seed press wheel that has a greater capability for correctly positioning the seed within the furrow created by a sowing unit of a precision seeder.

The product provided in accordance with the present invention is a seed press wheel for sowing units for precision seeders, comprising a solid tire in the shape of a disc that has a hole or central axis for mounting the tire on a hub, the solid tire comprising a first portion extending radially from the central hole and a second portion extending radially from the first portion.

The first portion is preferably made of a first material having a first modulus of elasticity value, and the second portion is made of a second material having a second modulus of elasticity value, the first modulus of elasticity value being different from the second modulus of elasticity value.

In this way it is possible to provide two zones having different mechanical behavior: this condition will allow the solid tire to deform differently in different zones and to therefore more efficiently follow the configurations and variations of the furrow in which the seed is optimally positioned.

In addition, another advantage deriving directly from the aforementioned technical features of the product produced in accordance with the present invention is that the different deformations that are created in different parts of the solid tire depending on the different moduli of elasticity produce local variations in elongation and contraction of the material, the variations preventing the adhesion of mud and earth. The first portion close to the hub defines a relatively rigid ring so that the wheel does not slip from the hub, whereas the second portion defines a soft peripheral ring, which can thus deform so as to promote the detachment of the ground and prevent retention of the seeds, which retention results in irregularities in the sowing distance.

This condition also improves the functionality of the solid tire, and therefore of the seed press wheel, keeping it cleaner and consequently increasing the efficacy thereof, allowing it to follow the configuration of the furrow in the ground more accurately and to position the seed in the desired position in the furrow.

In accordance with one embodiment, the first modulus of elasticity value is between 2.5 and 3.5 MPa, and the second modulus of elasticity value is between 0.5 and 1.5 MPa.

The applicant has demonstrated that it is possible in this way to improve the self-cleaning effect of the solid tire, whilst maintaining its optimal features of resistance to the forces applied during use by mechanical elements that connect the solid tire to the sowing unit or by the ground.

In accordance with a further aspect of the invention, the first material preferably has a modulus of elasticity of 3.2 MPa, and the second material has a modulus of elasticity of 0.9 MPa.

In this way, it is possible to obtain improved local deformability, and therefore the maximum capability for following the configuration of the furrow and the best condition of local deformation in order to activate the self-cleaning feature of the solid tire, together with optimal resistance on the part of the solid tire to the forces applied during use.

Furthermore, the second material, preferably, comprises mud release agents, for example having a fluorinated or silicone base, in order to increase the self-cleaning effect and also make a chemical contribution towards reducing any potential adhesion of the mud to the surface of the solid tire. In accordance with one embodiment, the first portion has annular conformation and can be found in a bead zone of the solid tire, and the second portion is annular and defines an intermediate zone between the bead zone and a tread zone of the solid tire, the bead zone, the intermediate zone and the tread zone being contiguous in pairs and respectively being radially arranged from closest to furthest away with respect to the central hole.

In this way, the optimal spatial arrangement of the elements having different moduli of elasticity is achieved: in fact, the first portion, which preferably has a modulus of elasticity greater than that of the second portion, is found in a bead zone of the solid tire, in which the forces associated with the mechanical elements of the sowing unit or of the seeder (hub, shaft, etc.) are normally applied; the second portion, which preferably has a modulus of elasticity lower than that of the first portion, is found in an intermediate zone between the bead portion and the tread portion of the solid tire, in which there is a greater deformability for the purpose of being able to follow the configuration of the furrow to the best possible extent and for greater deformation for the purpose of more easily detaching any adhered mud.

The annular configuration of the first and second portions also makes it possible to implement circularly uniform mechanical and tribological behavior, which is thus more easily supported by the disc-shaped seed press wheel.

In this context, the bead zone is a zone that defines an interface portion between the solid tire and a portion of a hub or of a shaft of the sowing unit of the seeder. This bead zone of the solid tire is that which interacts most with the hub and/or with the shaft and which is subject to the forces associated with these types of constraints. In addition, in this context, the tread zone is the portion of the solid tire comprising the surface distanced radially furthest from the central hole and intended for contact with the surface of the ground. Lastly, the intermediate zone in this context is the portion of the solid tire between the bead zone and the tread zone. It is clear that this intermediate zone produces a connection between the bead zone connected to the hub and/or the shaft of the sowing unit and the tread zone, which interacts mostly with the ground in which the seed is positioned.

The seed press wheel preferably comprises a third portion that has an annular configuration and is made of a third material having a third modulus of elasticity between the first modulus of elasticity value and the second modulus of elasticity value.

On account of this technical solution, a third portion is created which acts as an interface between the first and second portions, allowing a more gradual variation of the modulus of elasticity values and therefore gentler and less jerky behavior on the part of the seed press wheel.

In accordance with one embodiment, the intermediate zone has a tapered configuration so as to converge away from the bead zone and is made of, or of a material similar to, the second material or third material.

In this way it is possible to further optimize the deformability of the seed press wheel, making the full insertion of the seed press wheel into the furrow easier and more effective, the tapered part initiating this insertion, and therefore able to better adapt to the configuration of the furrow itself.

In accordance with one embodiment, the intermediate zone having a tapered configuration comprises shoulders having connection surfaces between the intermediate zone and the tread zone, and the angle formed between the shoulders is 22°.

In this context the shoulders define connection surfaces that can have a curvature for the purpose of optimally connecting the intermediate zone and the tread zone and provide a mechanical resistance so as to allow interaction with the ground such that no damage is sustained during use.

The applicant has demonstrated that the angle of 22° between the shoulders is an optimal angle for allowing the solid tire to enter the furrow effectively, even in conditions of irregular configuration of the ground and of the furrow itself.

The first material preferably has a hardness between 60 and 80 Shore A, and the second material preferably has a hardness of between 35 and 50 Shore A.

In this way it is ensured that the solid tire has a sufficiently increased tribological resistance, in particular for the portion within the bead zone.

In accordance with one embodiment, the solid tire is in the shape of a disc and has a dimensional ratio between its maximum diameter and its maximum thickness of between 5 and 15.

In this way, the solid tire has a shape having a greater dimension of extent in the radial direction relative to the central hole and is thus able to bend significantly by way of elastic deformation in directions substantially parallel to the axis of rotation, so as to be able to follow the configurations of the furrow in an optimal manner.

In accordance with one embodiment, the present invention is directed to a seeder that comprises a seed press wheel comprising a solid tire in the shape of a disc that comprises a central hole and comprising a first portion, which is made of a first material having a first modulus of elasticity value, and a second portion, which is made of a second material having a second modulus of elasticity value, the first modulus of elasticity value being different from the second modulus of elasticity value.

The aforementioned seed press wheel intended for a seeder is preferably obtained in accordance with a production method comprising: providing a mold for producing a solid tire comprised in the seed press wheel, injecting or pouring a first material into the mold in order to produce a first portion of the solid tire having a first modulus of elasticity value, injecting or pouring a second material into the mold in order to form a second portion of the solid tire having a second modulus of elasticity value that is different from the first modulus of elasticity value, and finishing forming the solid tire and extracting it from the mold.

In this way, it is possible to produce a seed press wheel having at least two portions made of materials having different moduli of elasticity and therefore different deformabilities, which thus allows a greater capability of the tire for following the various configurations of the furrow in the ground and for producing different, locally inhomogeneous deformations that increase the self-cleaning effect of the wheel following any potential adhesion of mud to the surface of the wheel itself.

It is to be understood that both the foregoing general description and the following detailed description are exemplary, but are not restrictive, of the disclosure.

BRIEF DESCRIPTION OF THE DRAWINGS

The features and advantages of the invention will become clearer from the detailed description of an exemplary embodiment, shown by way of non-restrictive example and with reference to the drawings, in which.

DETAILED DESCRIPTION OF A PREFERRED EMBODIMENT OF THE INVENTION

Figures 1, 2, 3:
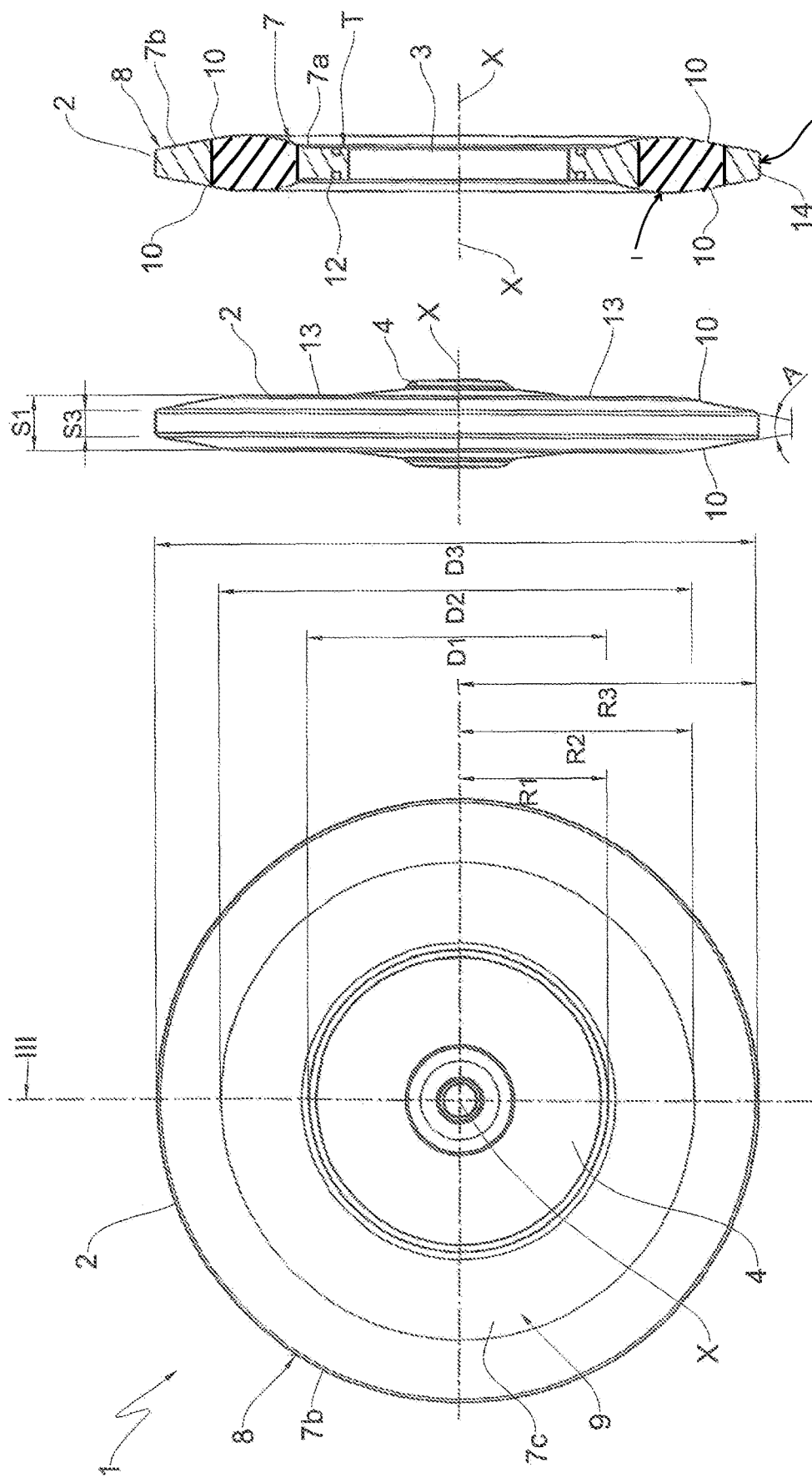
FIG. 1 is a view from the side of a seed press wheel.
FIG. 2 is a view from the front of the wheel of FIG. 1.
FIG. 3 is a sectional view of the wheel of FIG. 1 in the plane III.

In FIG. 1, reference sign 1 denotes a seed press wheel for sowing units of precision seeders. The seed press wheel includes a solid tire 2 in the shape of a disc that has a central hole 3 for mounting the tire on a hub 4. The solid tire 2 preferably has a first portion 7 extending radially from the central hole 3 and a second portion 8 extending radially from the first portion 7, the first portion 7 being made of a first material 7a having a first modulus of elasticity value E1, and the second portion 8 being made of a second material 7b having a second modulus of elasticity value E2, the first modulus of elasticity value E1 being different from the second modulus of elasticity value E2.

With reference to FIGS. 1, 2 and 3, it is clear that the central hole 3 preferably also has the shape of a disc.

An axis of rotation X of the seed press wheel 1 is preferably found at the center of the central hole 3.

The first modulus of elasticity value E1 is preferably greater than the second modulus of elasticity value E2, and, even more preferably, the first modulus of elasticity value E1 is between 2.5 and 3.5 MPa and the second modulus of elasticity value E2 is between 0.5 and 1.5 MPa. Such values of the first and second moduli of elasticity were calculated in accordance with standard ISO 37:2011 during tensile testing at modulus 100%.

The first material 7a and the second material 7b are advantageously made of synthetic, artificial or natural polymer rubbers, it also being possible to use polyurethane mixtures and/or EPDM compounds.

In accordance with one embodiment, the first material 7a has a modulus of elasticity equal to 3.2 MPa and the second material 7b has a modulus of elasticity equal to 0.9 MPa.

Figure 4:
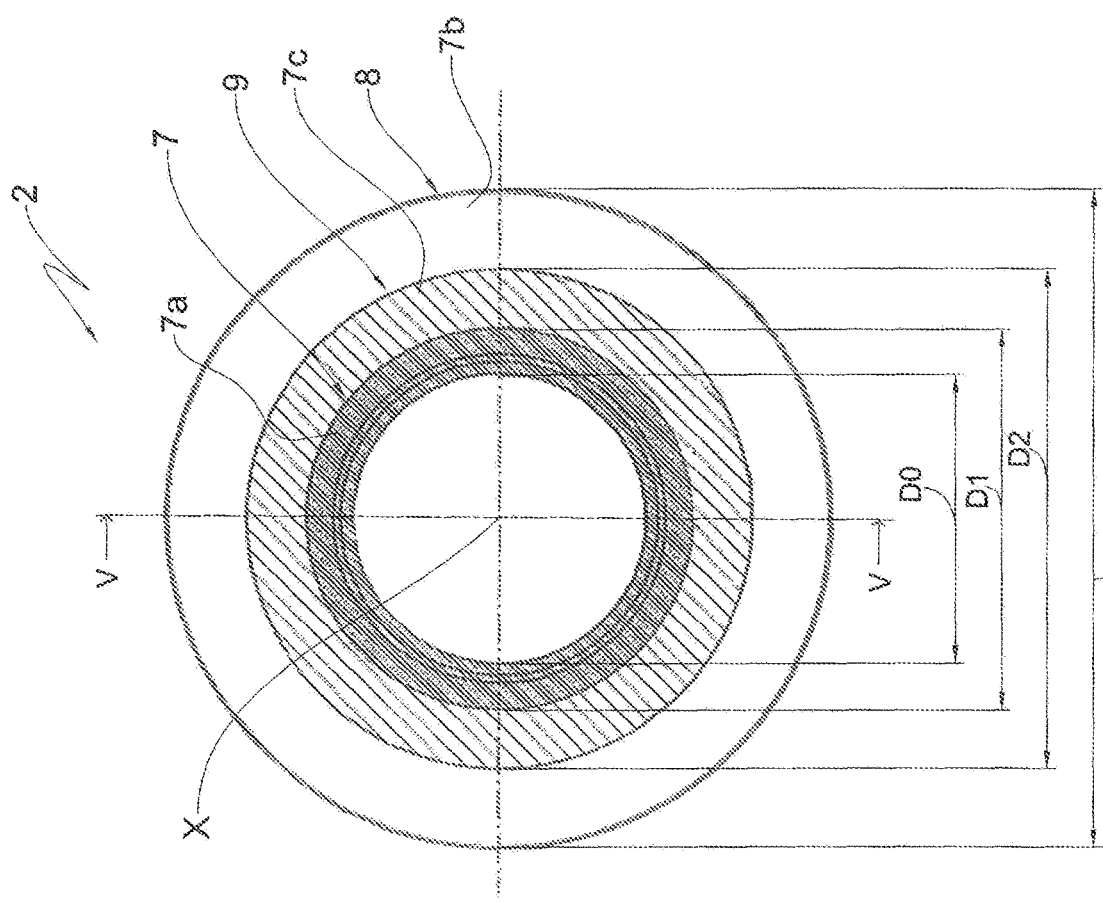
FIG. 4 is a view from the side of a solid tire of the wheel of FIG. 1.

Preferably and with reference to FIGS. 1 and 4, the first portion 7 has an annular configuration and can be found in a radially inner region of the solid tire 2 and defines a bead zone T. In addition, the second portion 8 has annular configuration and can be found in an intermediate zone I between the bead zone T and a tread zone B of the solid tire 2, the bead zone T, the intermediate zone I, and the tread zone B being contiguous in pairs and respectively being radially arranged from closest to furthest away with respect to the central hole 3.

With reference to FIGS. 1 and 4, the maximum diameter D3 and the minimum diameter D0 of the solid tire 2 can be seen, and it is clear that the first portion 7 is preferably between the minimum diameter D0 and a first diameter D of the solid tire 2 and that the second portion 8 is between a second diameter D2 and the maximum diameter D3. FIG. 1 also illustrates the first radius R1, the second radius R2 and the maximum radius R3 that correspond, respectively, to the first diameter D1, the second diameter D2 and the maximum diameter D3.

The hub 4 is advantageously fitted inside the central hole 3 onto the first portion 7 of the solid tire 2.

With reference to FIGS. 1 and 2, the aforementioned hub 4 preferably has a disc shape characterized by a hub diameter D4 and is made in a single piece or two parts that can be rigidly connected by engaging elements such as screws, nails, adhesives, etc.

By way of non-restrictive example of one embodiment, the minimum diameter D0 is equal to 132 mm, the hub diameter D4 is equal to 150 mm, the first diameter D1 is equal to 175 mm, the second diameter D2 is equal to 200 mm, and the maximum diameter D3 is equal to 300 mm.

Figure 5:
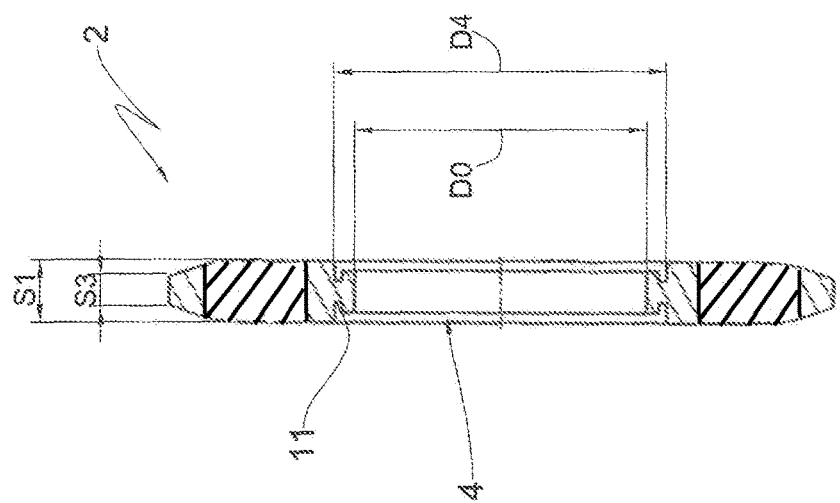
FIG. 5 is a sectional view of the solid tire of FIG. 4 in the plane V.

As shown in FIGS. 3 and 5, the hub 4 preferably comprises circular protrusions 12 which protrude towards the inside of the hub 4 in a direction substantially parallel to the axis of rotation X, and the first portion 7 comprises circumferential grooves 11, formed in walls perpendicular to the axis of rotation X, so as to engage by way of an interference fit with the protrusions 12 and thus increase the reciprocal constraint between the hub 4 and the solid tire 2.

The seed press wheel 1 preferably comprises a third portion 9 of an annular configuration and made of a third material 7c having a third modulus of elasticity value E3 between the first modulus of elasticity value E1 and the second modulus of elasticity value E2.

With reference to FIG. 4, the third portion 9 is preferably between the first diameter D1 and the second diameter D2 of the solid tire 2.

In accordance with an embodiment shown in FIGS. 2, 3 and 5, the intermediate zone I has a tapered configuration so as to converge away from the bead zone T and is made of the second material 7b or the third material 7c. This preferably implies that the intermediate zone I is made of a material having a third modulus of elasticity value E3 greater than the first modulus of elasticity value E1.

In this way, the ability of the solid tire 2 to enter and adapt optimally to the furrow produced in the ground, which generally has a V shape, is also improved.

Advantageously and with reference to FIG. 2, the intermediate zone I has a tapered configuration and comprises shoulders 10, comprising connection surfaces between the intermediate zone I and the tread zone B, and the angle formed between the shoulders 10 preferably is equal to 22°.

In accordance with one embodiment, the intermediate zone I and/or the bead zone T comprise lateral surfaces 13, preferably perpendicular to the axis of rotation X, the zones having a thickness, measured in a direction parallel to the axis of rotation X, referred to as the maximum thickness S1.

In accordance with one embodiment, the tread zone B comprises a tread surface 14, substantially parallel to the axis of rotation X, positioned in line with the maximum diameter D3 and intended to enter into contact with the ground of the furrow during use, having a thickness measured in a direction parallel to the axis of rotation X referred to as the tread thickness S3.

By way of non-restrictive example of an embodiment, the maximum thickness S1 is equal to 28 mm and the tread thickness S3 is equal to 13 mm.

The tapered configuration comprising shoulders 10 that connect the lateral surfaces 13 to the tread surface 14 advantageously maintains a substantially uniform inclination of the connection surfaces.

The first material 7a preferably has a hardness between 60 and 80 Shore A and the second material 7b preferably has a hardness between 35 and 50 Shore A.

In accordance with one embodiment, the solid tire 2 is in the shape of a disc and has a dimensional ratio R between its maximum diameter D3 and its maximum thickness S1 of between 5 and 15.

With reference to the exemplary embodiment described above, the maximum diameter D3 is equal to 300 mm and the maximum thickness S1 is equal to 28 mm, meaning that R is equal to 10.71.

One embodiment of the present invention is directed to a seeder comprising the seed press wheel 1. The seed press wheel 1 includes the solid tire 2 in the shape of a disc that has the central hole 3. The solid tire 2 has the first portion 7, which is made of the first material 7a having the first modulus of elasticity value E1, and the second portion 8, which is made of the second material 7b having the second modulus of elasticity value E2, the first modulus of elasticity value E1 being different from the second modulus of elasticity value E2.

The steps for producing the seed press wheel 1 intended for a seeder that define the production method are described below.

A user provides a mold for forming the solid tire 2 included in the seed press wheel 1.

Depending on the production method used (e.g., injection molding, casting, thermoforming, etc.) and depending on the physical characteristics of the materials used (e.g., melting point, softening point, glass transition temperature, viscosity, density, etc.), the materials deemed most suitable can be used for the molds (e.g., molds made of steel, aluminum alloys, etc.), these being known to a person skilled in the art.

The user then injects or pours the first material 7a into the mold so as to form the first portion 7 of the solid tire 2 having the first modulus of elasticity value E1.

This first material 7a is preferably a rubber having the first modulus of elasticity value E1 between 2.5 and 3.5 MPa.

In accordance with one embodiment, the user injects or pours the second material 7b into the stamp so as to form the second portion 8 of the solid tire 2 having the second modulus of elasticity value E2 that is different from the first modulus of elasticity value E1.

This second material 7b is preferably a rubber having the second modulus of elasticity value E2 between 0.5 and 1.5 MPa.

The relative phases of injection or pouring of the first and second materials can be performed advantageously at the same time, and therefore using a bi injection system, or at two separate moments, and therefore using a successive injection system.

In accordance with one embodiment, the user finishes forming the solid tire 2 and extracts it from the mold so as to be able to use it directly, without the need to remove cores such as those required for the production of hollow tires.

In accordance with an embodiment of the aforementioned method, the third material 7c having the third modulus of elasticity value E3 is injected or poured into the mold before or after the injection or pouring of the aforementioned second material 7b.

This third modulus of elasticity value E3 is advantageously between the first modulus of elasticity value E1 and the second modulus of elasticity value E2.

The first portion 7 preferably has an annular configuration and can be found in the bead zone T of the solid tire 2, and the second portion 8 preferably has an annular configuration and defines the intermediate zone I between the bead zone T and the tread zone B of the solid tire 2, the bead zone T, the intermediate zone I and the tread zone B being contiguous in pairs and respectively being radially arranged from closest to furthest away with respect to the central hole 3.

In accordance with one embodiment of the aforementioned method, the intermediate zone I has a tapered configuration so as to converge away from the bead zone T and is made of, or of a material similar to, the second material 7b or the third material 7c.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure. It is expressly intended, for example, that all ranges broadly recited in this document include within their scope all narrower ranges which fall within the broader ranges.

The invention claimed is:

1. A seed press wheel for sowing units for precision seeders, comprising a solid tire in the shape of a disc that has a predetermined axis for mounting the solid tire on a hub, the hub having a protrusion and the solid tire including an untapered first portion extending radially from the axis and having a groove engaging the protrusion to constrain the solid tire on the hub, and a tapered second portion extending radially from the first portion, wherein the first portion is made of a first material having a first modulus of elasticity value, and the second portion is made of a second material having a second modulus of elasticity value, the first modulus of elasticity value being greater than the second modulus of elasticity value, wherein the second portion and the hub are connected only through the first portion, and wherein the second portion defines a tread of the solid tire.

2. The seed press wheel according to claim 1, wherein the first modulus of elasticity value is between 2.5 and 3.5 MPa, and the second modulus of elasticity value is between 0.5 and 1.5 MPa.

3. The seed press wheel according to claim 2, wherein the first material has a modulus of elasticity of 3.2 MPa and the second material has a modulus of elasticity of 0.9 MPa.

4. The seed press wheel according to claim 1, wherein the first portion has an annular configuration and defines a bead zone of the solid tire, and the second portion is annular and is located in an intermediate zone between the bead zone and a tread zone of the solid tire, the bead zone, the intermediate zone and the tread zone being contiguous in pairs and respectively being radially arranged from closest to furthest away with respect to the axis.

5. The seed press wheel according to claim 1, wherein the hardness of the first material is between 60 and 80 Shore A and the hardness of the second material is between 35 and 50 Shore A.

6. The seed press wheel according to claim 1, wherein the solid tire has a dimensional ratio between its maximum diameter and its maximum thickness between 5 and 15.

7. A seeder comprising a seed press wheel including a solid tire in the shape of a disc that comprises a central hole for mounting the solid tire on a hub having a protrusion, an untapered first portion which is made of a first material having a first modulus of elasticity value and which has a groove engaging the protrusion to constrain the solid tire on the hub, and a tapered second portion which is made of a second material having a second modulus of elasticity value, the first modulus of elasticity value being greater than the second modulus of elasticity value, wherein the second portion and the hub are connected only through the first portion, and wherein the second portion defines a tread of the solid tire.

8. The seed press wheel according to claim 4, wherein the intermediate zone has a tapered configuration so as to converge away from the bead zone and is made of the second material.

9. The seed press wheel according to claim 4, wherein the intermediate zone has a tapered configuration and comprises shoulders having connection surfaces between the intermediate zone and the tread zone, and the angle formed between the shoulders is 22°.

10. The seed press wheel according to claim 1, wherein the ratio between the first modulus of elasticity value and the second modulus of elasticity value is lower than or equal to 7.

11. The seed press wheel according to claim 1, wherein the ratio between the first modulus of elasticity value and the second modulus of elasticity value is greater than or equal to 5/3.

12. The seed press wheel according to claim 1, wherein the solid tire has a dimensional ratio between its maximum diameter and its maximum thickness greater than 5.

13. A seed press wheel for sowing units for precision seeders, comprising a solid tire in the shape of a disc that has a predetermined axis for mounting the tire on a hub, the solid tire including a first portion extending radially from the axis, and at least one second portion extending radially from the first portion, wherein the first portion is made of a first material having a first modulus of elasticity value, and the second portion is made of a second material having a second modulus of elasticity value, the first modulus of elasticity value being different from the second modulus of elasticity value, wherein the first portion has an annular configuration and defines a bead zone of the solid tire, and the second portion is annular and is located in an intermediate zone between the bead zone and a tread zone of the solid tire, the bead zone, the intermediate zone and the tread zone being contiguous in pairs and respectively being radially arranged from closest to furthest away with respect to the axis, and wherein the intermediate zone has a tapered configuration and comprises shoulders having connection surfaces between the intermediate zone and the tread zone, and the angle formed between the shoulders is 22°.

* * * * *